United States Patent
Hoofman et al.

(10) Patent No.: US 8,330,191 B2
(45) Date of Patent: Dec. 11, 2012

(54) INTRUSION PROTECTION USING STRESS CHANGES

(75) Inventors: Romano Hoofman, Geel (BE); Remco Henricus Wilhelmus Pijnenburg, Hoogeloon (NL); Youri Victorovitch Ponomarev, Leuven (BE)

(73) Assignee: NXP B.V., Eindhoven (NL)

( * ) Notice: Subject to any disclaimer, the term of this patent is extended or adjusted under 35 U.S.C. 154(b) by 164 days.

(21) Appl. No.: 12/997,576

(22) PCT Filed: May 26, 2009

(86) PCT No.: PCT/IB2009/052184
§ 371 (c)(1),
(2), (4) Date: Dec. 10, 2010

(87) PCT Pub. No.: WO2009/150558
PCT Pub. Date: Dec. 17, 2009

(65) Prior Publication Data
US 2011/0089506 A1 Apr. 21, 2011

(30) Foreign Application Priority Data
Jun. 13, 2008 (EP) .................................... 08104403

(51) Int. Cl.
*H01L 29/84* (2006.01)
*G08B 13/14* (2006.01)
(52) U.S. Cl. ..................................... 257/254; 340/568.1
(58) Field of Classification Search .................. 340/540, 340/568.1, 657; 438/50–53; 257/254
See application file for complete search history.

(56) References Cited

U.S. PATENT DOCUMENTS
2008/0247098 A1* 10/2008 Deak ............................. 360/328

FOREIGN PATENT DOCUMENTS
EP 0509567 * 10/1992
EP 1523228 * 4/2005
* cited by examiner

*Primary Examiner* — Calvin Lee

(57) ABSTRACT

The invention relates to a integrated circuit comprising an electronic circuit integrated on a substrate (5), and further comprising protections means for protection of the electronic circuit (25). The protection means comprise: i) a first strained encapsulation layer (10) being provided on a first side of the substrate (5), wherein the first strained encapsulation layer (10) has a strain (S1) in a direction parallel to the substrate (5), and ii) disabling means (20) arranged for at least partially disabling the electronic circuit (25) under control of a strain change in the substrate (5). The invention further relates to a method of manufacturing such integrated circuit, and to a system comprising such integrated circuit. Such system is selected from a group comprising: a bank-card, a smart-card, a contact-less card and an RFID. All embodiments of the integrated circuit in accordance with the invention provide essentially an alternative tamper protection to the data stored or present in the electronic circuit therein. A first main group of embodiments concerns an integrated circuit wherein tamper protection is obtained by detecting a strain change during tampering and subsequently disabling the electronic circuit. A second main group of embodiments concerns an integrated circuit wherein tamper protection is obtained by designing a stack of strained encapsulation layers, such that tampering causes releasing of strain and thereby mechanical disintegrate (break, delaminate, etc) of the integrated circuit, and thus disabling the electronic circuit.

14 Claims, 6 Drawing Sheets

INTRUSION PROTECTION USING STRESS CHANGES

FIELD OF THE INVENTION

The invention relates to an integrated circuit comprising an electronic circuit integrated on a substrate, and further comprising protections means for protection of the electronic circuit. The invention further relates to a method of manufacturing such integrated circuit. The invention also relates to a system comprising such integrated circuit.

BACKGROUND OF THE INVENTION

Nowadays, much (personal) data is stored on memory modules embedded in systems, such as smartcards for pay-TV or electronic purses. In order to protect data, security should be as high as possible. Typically, the data is protected from external read-out with a secure key. Once the key is known, the data can be read out. The external read-out of data by decryption of the data is known as a non-invasive attack.

In invasive attacks the chip is de-packaged, where the goal is direct read-out of the data in the memory or disabling the key by UV radiation. Both approaches require removal of the chip package and sometimes even the passivation layers. Generally, it is quite difficult to protect against these kinds of physical attacks. More information on tamper resistance of ICs can be found in: USENIX Association, "Tamper Resistance—a Cautionary Note", The Second USENIX Workshop on Electronic Commerce Proceedings, Oakland, Calif., Nov. 18-21, 1996, pp 1-11, ISBN 1-880446-83-9 (also available at the following site: www.cl.cam.ac.uk/~rja14/tamper.html).

Many methods to protect against non-invasive attacks are known and most disclosures about IC security focus mainly on these attacks. For the protection against invasive attacks fewer solutions are known. Meanwhile, history has shown that hackers come up with more clever attack techniques regularly.

In view of the above mentioned situation there is a need for an alternative type of tamper protection.

SUMMARY OF THE INVENTION

It is an object of the invention to provide an integrated circuit with an alternative type of tamper protection against invasive attacks and semi-invasive attacks.

The invention is defined by the independent claims. The dependent claims define advantageous embodiments.

In a first aspect, the invention relates to an integrated circuit comprising an electronic circuit integrated on a substrate, and further comprising protections means for protection of the electronic circuit, the protection means comprising: i) a first strained encapsulation layer being provided on a first side of the substrate, wherein the first strained encapsulation layer has a strain in a direction parallel to the substrate, and ii) disabling means arranged for at least partially disabling the electronic circuit under control of a strain change in the substrate. The effect of the features of the integrated circuit in accordance with the invention is as follows. The first strained encapsulation layer at least induces a stress on the substrate, which leads to an oppositely strained substrate (at least locally in a region near the first strained encapsulation layer). Tampering with the integrated circuit implies a partial removal of the first strained encapsulation layer which in any case leads to a local change in the stress on the substrate, and consequently a strain change in the substrate. This strain change can be used to control the disabling of the electronic circuit either directly or indirectly. Disabling the electronic circuit prevents access to data stored therein and thus an integrated circuit having an alternative tampering protection is obtained. There are different options for disabling the electronic circuit. This will be elaborated upon in the discussion of the embodiments hereinafter.

In an embodiment of the integrated circuit in accordance with the invention the disabling means comprises: i) at least one strain detector for detecting the strain change in the substrate, and ii) a disabling circuit being arranged for receiving a signal indicative of the strain change from the strain detector, the disabling circuit being coupled to the electronic circuit for disabling the electronic circuit upon detection of the strain change in the substrate. As already discussed, the first strained encapsulation layer induces an opposite strain in the substrate, in particular at a surface of the substrate facing the first strained encapsulation layer. Tampering with the first strained encapsulation layer causes, at least locally, a strain change of the first strained encapsulation layer and thus also in the substrate. The strain detector measures the strain change and the disabling circuit may be arranged for disabling the electronic circuit if the strain change exceeds a certain threshold, which may prevent any information stored therein to be retrieved by a hacker. This embodiment concerns a first main group of embodiments having a high data protection level.

In an embodiment of the integrated circuit in accordance with the invention the strain detector has been integrated on the substrate. This embodiment provides a monolithic solution which is more cost-effective.

In an embodiment of the integrated circuit in accordance with the invention the strain detector comprises a charge carrier mobility detector arranged for detecting the charge carrier mobility in the substrate. Strain is known to have an influence on the charge carrier mobility. A strain change may thus be detected by monitoring the charge carrier mobility. A change in the charge carrier mobility indicates a change in the strain. In conventional charge carrier mobility detectors the charge carrier mobility is determined by a magnitude of an output current.

In an embodiment of the integrated circuit in accordance with the invention the disabling means comprises a plurality of strain detectors for detecting strain changes in the substrate, and the plurality of strain detectors are spread over a surface of the substrate, the disabling circuit being arranged for receiving signals indicative of the strain changes from the plurality of strain detectors. The plurality of strain detectors that are spread over a surface of the substrate feature a larger strain detection area coverage and thus a better tamper protection.

In an embodiment of the integrated circuit in accordance with the invention the protection means further comprises a second strained encapsulation layer being provided on a second side, opposite to the first side, of the substrate, and the second strained encapsulation layer has a strain in a substantially same direction as a strain in the first strained encapsulation layer. The provision of two strained encapsulation layers, one at each side of the substrate, leads to a mechanically more stable structure. This larger mechanical stability is caused by a more uniform strain in the substrate, i.e. a smaller or practically no strain gradient, in an untampered state. Another advantage is that this embodiment provides a two-sided tamper protection.

In an embodiment of the integrated circuit in accordance with the invention the first strained encapsulation layer and/or the second strained encapsulation layer comprises polymer or ceramic material film. The advantage of using polymer and ceramic materials for the encapsulation layer is that these materials are compatible with known packaging processes and are easily applied to the structure.

In an embodiment of the integrated circuit in accordance with the invention the disabling means further comprises a further encapsulation layer being provided on the first strained encapsulation layer and being arranged for reducing strain in the substrate caused by the first strained encapsulation layer, and the substrate and the first and further encapsulation layers are configured for mechanical disintegration, for example breaking or delaminating, of the integrated circuit under a strain change in the substrate, and the strain change is caused by tampering with the further encapsulation layer which releases the strain in the first strained encapsulation layer and thereby increases the strain in the substrate. Tampering with the further encapsulation layer causes the strain in the substrate to increase, because it then effectively releases the stress in the first strained encapsulation layer. The substrate may bend due to the strain consequently which reduces the strain in the first strained encapsulation layer. Consequently, the strain of the substrate, and in particular at a surface facing the first encapsulation layer, increases (but is opposite to the strain originally present in the first encapsulation layer), and the substrate with the electronic circuit may get cracks and/or pinholes or even break completely which may disable the electronic circuit, which may prevent any information stored therein to be retrieved by a hacker. Alternatively, the released strain may result in delamination of the integrated circuit, which also effectively disables the electronic circuit. The provision of a further encapsulation layer on the first strained encapsulation layer reduces strain in the substrate, because in that case the first strained encapsulation layer also applies a stress to the further encapsulation layer. The total stress applied by the first encapsulation layer is spread over two layers and thus the stress applied to the substrate is reduced. This embodiment concerns a second main group of embodiments.

In an embodiment of the integrated circuit in accordance with the invention the further encapsulation layer has a strain in a direction substantially opposite to a strain in the first strained encapsulation layer. The effect described in the previous paragraph is stronger if the further encapsulation layer has an opposite strain with respect to the first encapsulation layer. A larger strain reduction in the substrate is thus achieved.

In an embodiment of the integrated circuit in accordance with the invention the thickness of the substrate lies in the range from 20 μm to 100 μm. The ease with which the substrate may be mechanically disintegrated, i.e. broken, depends also on, next to other parameters, the thickness of the substrate. If the substrate becomes too thick it may not be broken that easily anymore.

In an embodiment of the integrated circuit in accordance with the invention the substrate has a spatially varying thickness for facilitating controllably breaking of the substrate. Providing the substrate with a spatially varying thickness enables control on the location where the substrate will break. In most cases the substrate will break at locations where the substrate is thinner than the surrounding part when the stress applied by the first strained encapsulation layer on the substrate exceeds a certain minimum value (which depends on various parameters). Also pre-existing defects and pre-designed defects (cracks and grooves) make it possible to induce cracks and therefore mechanical disintegration, i.e. breaking, at a pre-designed location.

In an embodiment of the integrated circuit in accordance with the invention the substrate is provided with at least one indentation or trench at least at one side for facilitating the breaking of the substrate, and a location of the indentation is chosen to correspond with a location of the electronic circuit. The advantage of this embodiment is that the substrate will break at the location of the indentation when the stress applied by the first strained encapsulation layer on the substrate exceeds a certain minimum value (which depends on various parameters such as substrate thickness, substrate material, strain in the encapsulation layer, etc).

In an embodiment of the integrated circuit in accordance with the invention the disabling means further comprise: i) a conductor, ii) an integrity sensor coupled to the conductor for sensing a change in integrity of the conductor, wherein the mechanical disintegration causes damage to the conductor, and iii) a further disabling circuit being arranged for receiving a signal indicative of the integrity of the conductor, the further disabling circuit being coupled to the electronic circuit for disabling the electronic circuit upon sensing of a change in the integrity of the conductor. Any deformation or cracking of the substrate may result in cracks in or interruptions of the conductor and may be sensed using this embodiment. This embodiment thus features an efficient detection (by sensing) of the mechanical disintegration of the integrated circuit. It is also built for using this detection as a trigger for disabling the electronic circuit. This embodiment is especially attractive in those situations where breaking of the substrate may not be enough to prevent access to the data in the electronic circuit.

In an embodiment of the integrated circuit in accordance with the invention the conductor is integrated in the electronic circuit. This embodiment constitutes a first variant of the location of the conductor.

In an embodiment of the integrated circuit in accordance with the invention the conductor is integrated in the first strained encapsulation layer. This embodiment constitutes a second variant of the location of the conductor.

In an embodiment of the integrated circuit in accordance with the invention the electronic circuit comprises one or more memory elements for storing data. Data retaining elements, such as memory elements, are particularly prone to tampering methods by hackers. Such elements benefit from the tamper protection as provided by the integrated circuit in accordance with the invention.

In an embodiment of the integrated circuit in accordance with the invention the disabling circuit is arranged for deleting the data in memory elements.

In a second aspect the invention relates to a method of manufacturing the integrated circuit, wherein the method comprises steps of:
i) providing the electronic circuit integrated on the substrate, and
ii) providing the protection means, wherein this step comprises sub-steps of:
   a) providing the first strained encapsulation layer on a first side of the substrate, and
   b) providing the disabling means.

In an embodiment of the method in accordance with the invention the sub-step of providing the disabling means comprises the provision of the further encapsulation layer on the first strained encapsulation layer.

In an embodiment of the method in accordance with the invention the first strained encapsulation layer and the further encapsulation layer are provided using a lamination flow.

In a third aspect the invention relates to a system comprising the integrated circuit in accordance with the invention. Many systems may benefit from the tamper protection the integrated circuit of the invention offers.

In an embodiment such system is selected from a group comprising: a bank-card, a smart-card, a contact-less card and an RFID.

These and other aspects of the invention are apparent from and will be elucidated with reference to the embodiments described hereinafter.

DETAILED DESCRIPTION OF THE PREFERRED EMBODIMENT

Figure 1:
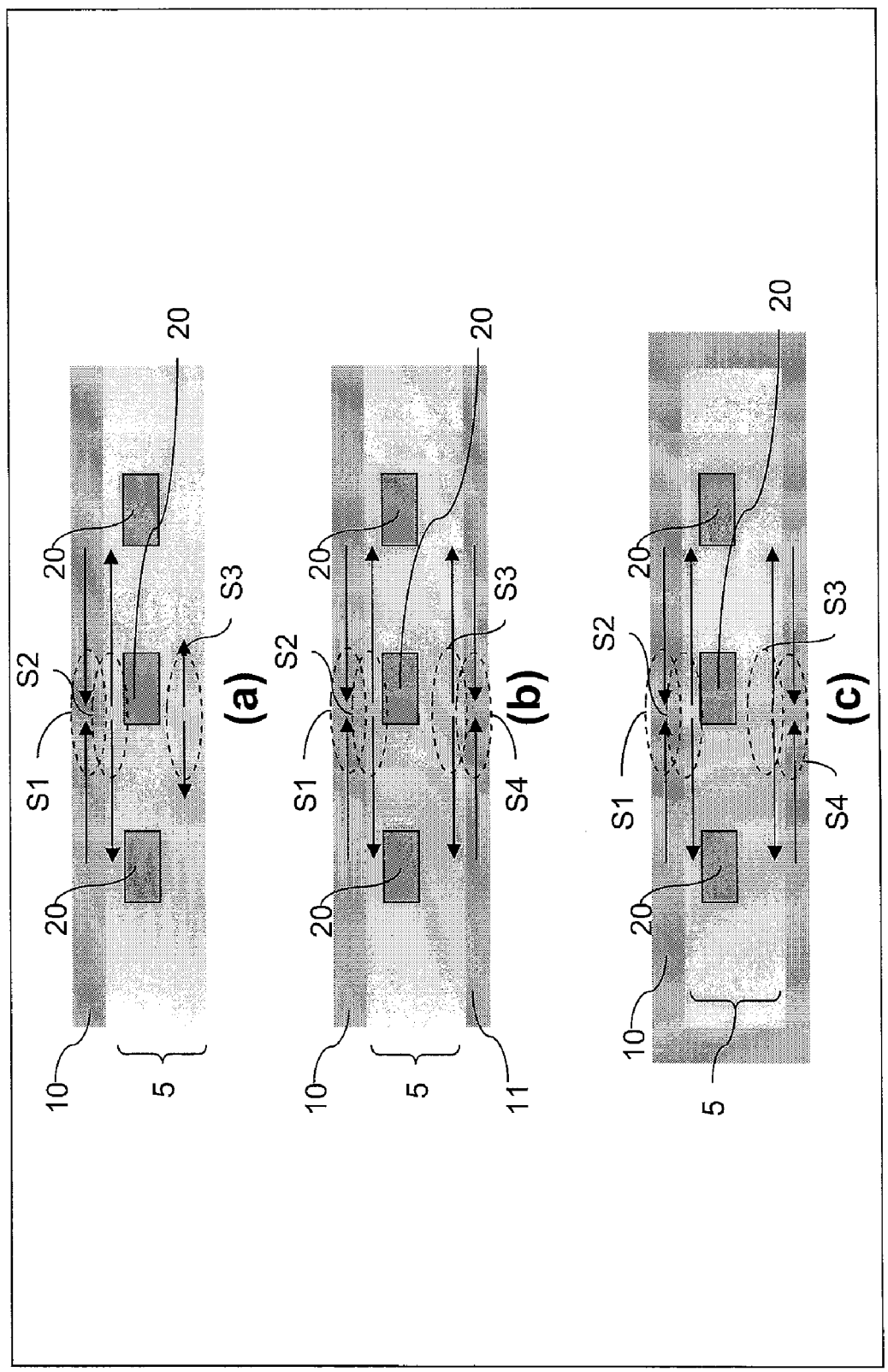
FIGS. 1(a) to 1(c) show three variants of an integrated circuit in accordance with a first group of embodiments of the invention.

The invention provides for a new tamper protection technique against invasive attack techniques, which helps to stay ahead of hackers. Hackers are known for keeping on improving their attack techniques for retrieving secret data from integrated circuits. Especially integrated circuits having memory elements, such as non-volatile memories (ROM, EPROM, EEPROM, FLASH, MRAM, etc) are of interest for hackers as these often contain secret keys for encryption purposes or other data which needs protection. The tamper protection technique provided by the invention may be advantageously combined with known tamper protection techniques from the prior art. Such combination may result in even higher protection levels. Remarks to this extent are only made in as far as such combination is not self-explaining.

In order to facilitate the discussion of the detailed embodiments a few expressions are defined hereinafter.

Throughout this description the term "encapsulation layer" refers to a layer which is made during the packaging stage of an integrated circuit. Passivation layers (for example silicon nitride layers) which are typically provided on a metallization stack (stack of metallization layers) of an integrated are not included in this feature. A passivation layer is to be considered as part of the metallization stack in this invention.

Throughout this description the term "stress" generally refers to an applied force or system of forces that tend to strain or deform a body, whereas the term "strain" is to be interpreted as a deformation produced by stress. These definitions are illustrated with the following example. A strained layer is a layer which is deformed. This deformation results in the fact that this strained layer applies a stress to a lower layer on which it is provided. If this stress is large enough this stress may result in a strain of the lower layer. In the prior art the terms "stress" and "strain" are often mixed up and used interchangeably, which renders a proper understanding of the prior art sometimes difficult.

Throughout this description the term "interconnect layer" should be considered as synonym to "metallization layer" or "metal layer". Both terms are used interchangeably and have to be interpreted as the layer comprising conductors (any conducting material), the insulating layer in which the conductors are embedded, and any vias (=contacts) to underlying layers. These terms are well-known to the person skilled in the art of semiconductor technology.

Throughout this description the term substrate should be interpreted broadly. The substrate may comprise in an active layer at its front-side elements, e.g. transistors, capacitors, resistors, diodes, and inductors, which form the components of an electronic circuit. The substrate may further comprise interconnections between the elements which may be laid out in one or more interconnect layers. In the figures, the elements have been left out in order to facilitate the understanding of the invention. The active layer in which the elements are formed may also be called a semiconductor body. The semiconductor body may comprise any one of the following semiconductor materials and compositions such as silicon (Si), germanium (Ge), silicon germanium (SiGe), gallium-arsenide (GaAs) and other III-V compounds such as indium-phosphide (InP), cadmium sulfide (CdS) and other II-VI compounds, or combinations of these materials and compositions. The active elements together may form an electronic circuit. In any case, connection of the active elements is done via interconnect layers. These interconnect layers have parasitic capacitances which are defined by the dielectric constant of surrounding materials. The semiconductor body may even comprise contacts to lower layers (e.g. diffusion regions at the surface of an active region).

In this description the "front-side" of a semiconductor device is defined as the side of the semiconductor device on which circuitry is provided. Likewise, the "back-side" of the semiconductor device is defined as the side opposite to the front-side. Often there is no circuitry on the back-side. However, developments are visible in the prior art which go more and more in this direction. In any case, if there is circuitry on the back-side such circuitry may need tamper protection as well.

FIGS. 1(a) to 1(c) show three variants of an integrated circuit in accordance with a first group of embodiments of the invention. In this group of embodiments the object is to provide an integrated circuit, which disables the electronic circuit in response to a detected strain change in the substrate. FIG. 1(a) shows a first variant of the integrated circuit. This variant comprises an electronic circuit (not shown) integrated on a substrate 5. On the substrate 5 a strained encapsulation layer 10 is provided. The strain S1 of the first strained encapsulation layer 5 is directed in a direction parallel to the substrate 5. It may be a compressive strain or a tensile strain. In FIG. 1(a) the strain S1 in the encapsulation layer 10 is illustrated as a compressive strain. By way of compensation, the strain direction is illustrated in the same manner throughout the complete description consistently. It is even possible to provide the encapsulation layer 10 with a combination of both strain directions, meaning that at one location the layer 10 has a compressive strain and in another location the layer 10 has a tensile strain. In the substrate 5 (not necessarily part of the electronic circuit, but this is possible) a plurality of strain detectors 20 is provided (but it could be also only one).

The embodiment of FIG. 1(a) operates as follows. The strain S1 in the encapsulation layer 10 exerts a stress on the substrate 5. If the integrated circuit is well designed this stress is large enough and will result in an (at least locally), opposite, strain S2 in the substrate 5. Most likely the strain S2 induced in the substrate 5 will not be uniform, i.e. there will be a strain gradient. Strain gradients may be accompanied by a bending of the substrate 5. Consequently, at a location further away from the strained encapsulation layer 10, i.e. at a backside of the substrate 5, a smaller strain S3 will be induced (or even no strain at all). Here, "well designed" means, amongst other things, for example, having a proper dimensioning of the thickness of the encapsulation layer 10 and the substrate 5 and a proper choice of materials and strain for the encapsulation layer 10. More information on proper dimensioning will be given later in the description. With "opposite" strain is meant "a strain of the other type", i.e. a tensile instead of a compressive strain, or a compressive instead of a tensile strain. When the encapsulation layer 10 is tampered this almost inevitably will result in a change in the strain S2 induced in the substrate 5. Such strain change is then detected by at least one of the strain detectors 20. This event (strain change detection) may then be used to trigger a mechanism in which any data (i.e. an encryption key) in the electronic circuit is erased or corrupted.

One way of detecting a strain change in the substrate 5 is by monitoring the charge carrier mobility in the substrate 5. It is known that a change in the strain in a semiconductor material has an influence on the charge carrier mobility. Detecting a change in the charge carrier mobility may thus be a consequence of a change in the strain. Measurement of the charge carrier mobility is well known to the person skilled in the art. The following references deal with strain and their effect on the charge carrier mobility, and how this may be measured:
S. E. Thompson, G. Sun, K. Wu, J. Lim and T. Nishida, Proceeding of the IEDM Conference 2004, p. 221-224, and T. Ghani, et al. Proceeding of the IEDM Conference 2003, p. 978-980. Both documents cited above are hereby incorporated by reference in their entirety.

The encapsulation layer 10 in this group of embodiments may comprise various materials such as polymer and ceramics. Within these two classes many options exist. The next table gives examples of these two material classes and also specifies which deposition techniques may be used for deposition of these materials.

TABLE 1

Possible encapsulation layer materials, examples, and deposition techniques

| Material | Examples | Deposition technique |
|---|---|---|
| Polymers | polyimide, polyethylene (PET), silicone-rubbers, epoxy, . . . | spin-coating, vapor-deposition, lamination, immersion coating, spraying |
| Ceramics | oxides: alumina (aluminum oxide), zirconia non-oxides: carbides, borides, nitrides, silicides | physical phase deposition (PVD), chemical phase deposition (CVD), aerosol deposition, molecular beam epitaxy |

FIG. 1(b) shows a second variant of the integrated circuit. This embodiment will only be discussed in as far as it differs from the first variant. The difference with the first variant is that, next to the (first) strained encapsulation layer 10, a second strained encapsulation layer 11 is provided on the back-side of the substrate 5. In this example the second strained encapsulation layer 11 is provided with a same strain S4 as the strain S1 of the first encapsulation layer 10. A consequence of this feature is that the strains S2, S3 induced in the substrate 5 will be more uniform (a smaller strain gradient in the substrate 5). This is better for the reliability of the integrated circuit. Yet a more important advantage of this embodiment is that a two-side tamper protection is achieved. It is not essential that the strain S4 in the second encapsulation layer 11 is the same as that of the first encapsulation layer 10 (in fact they even may be oppositely directed). However, for reliability it is better if they are the same or at least comparable such that the stress (and strain) in the substrate is more uniform.

FIG. 1(c) shows a third variant of the integrated circuit. This embodiment will only be discussed in as far as it differs from the other variants. The difference with the second variant is that the (first) strained encapsulation layer 10 is provided all around the substrate 5. The advantage of this embodiment is that the encapsulation layer may be provided with techniques such as: lamination, molding, vapor deposition, epitaxy, and immersion coating. All these techniques are well-known to the person skilled in the art. Strain may be applied by deposition at elevated temperature (or at least a temperature different from the operation temperature), when cooling down (or warming up) to room temperature the film will be automatically strained (thanks to different thermal expansion coefficient (CTE) of the substrate and the encapsulation layer. Strain can also be applied in a lamination process by stretching the film (foil). More information on the application of strain can be found in: S. Ochiai, et al., *"Thermally and mechanically induced residual strain and strain tolerance of critical current in stainless steel-laminated Bi2223/Ag/Ag alloy composite Superconductors"*, Supercond. Sci. Technol. 21 (2008) 075009. This document is hereby incorporated by reference in its entirety. Typically, the encapsulation layer materials are epoxy or silicone-based and the thicknesses are in the order of several microns.

FIGS. 2(a) to 2(c) show three variants of an integrated circuit in accordance with a second group of embodiments of the invention. In this group of embodiments the object is to provide an integrated circuit, which automatically disintegrates mechanically during a tamper action of a hacker. Mechanical disintegration means that the integrated circuit breaks or at least gets cracks and/or pinholes, i.e. damage to the lattice structure, in a location where the electronic circuit is present or where detectors and/or sensors are present. The words "mechanical disintegration" may also be replaced by "physical disintegration" throughout this description.

Figure 2:
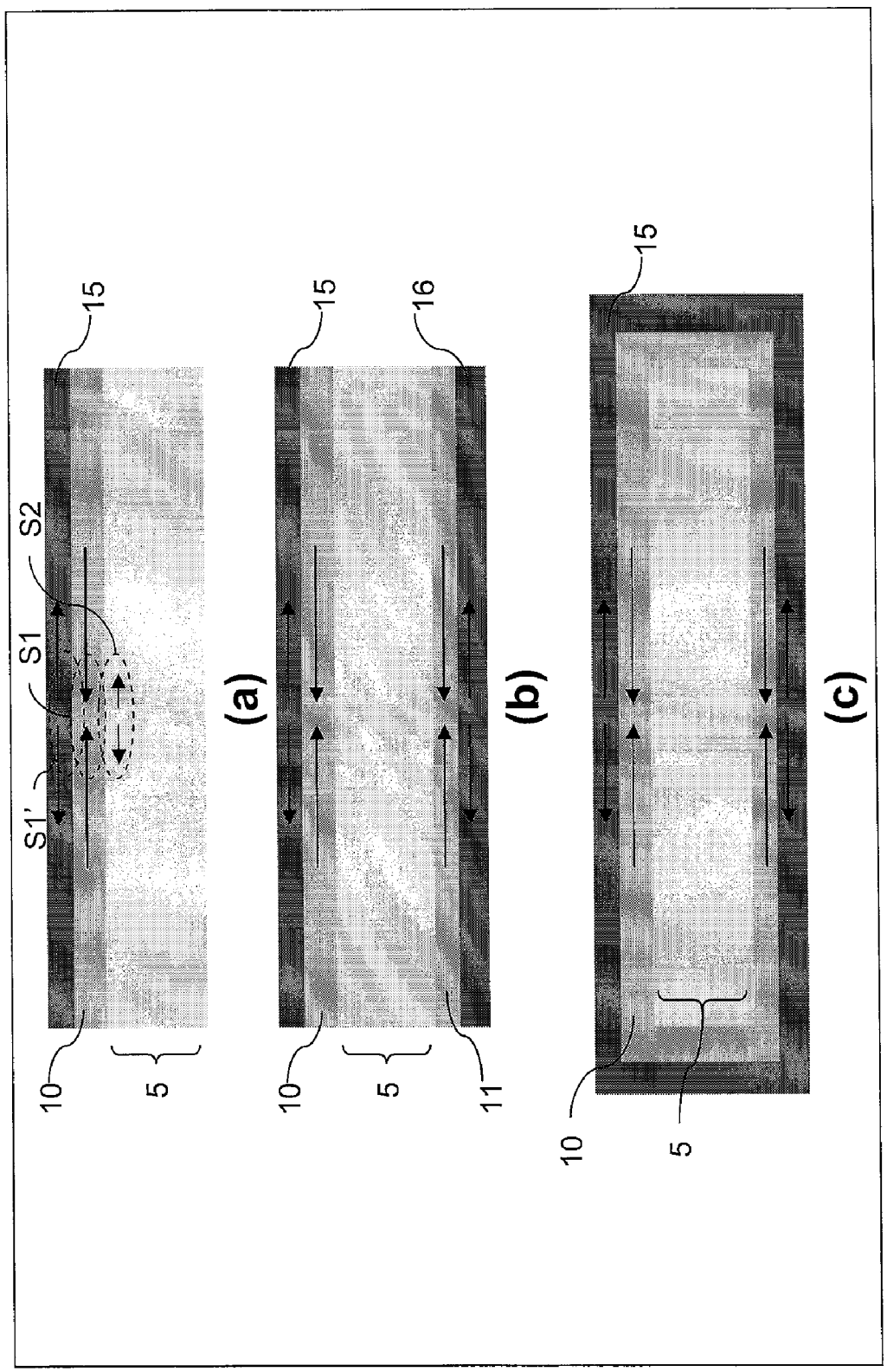
FIGS. 2(a) to 2(c) show three variants of an integrated circuit in accordance with a second group of embodiments of the invention.

FIG. 2(a) provides a first variant of the integrated circuit. This variant comprises an electronic circuit (not shown) integrated on a substrate 5. On the substrate 5 a strained encapsulation layer 10 is provided. The strain S1 of the first strained encapsulation layer 10 is oriented in a direction parallel to the substrate 5. It may be a compressive strain or a tensile strain. In FIG. 2(a) the first strained encapsulation layer is provided with a compressive strain S1. On the first strained encapsulation layer 10 a further encapsulation layer 15 is provided. In this example embodiment this encapsulation layer 15 is provided with an opposite strain S1' compared to the first encapsulation layer 10. It is not essential that this layer is an oppositely strained layer, as deposited. However, the purpose of this further encapsulation layer 15 is to compensate, or mask, the strain in the first encapsulation layer 10. Providing the further encapsulation layer 15 with an opposite strain S1' increases this masking or compensation effect. Explained differently, the stress exerted by the first encapsulation layer 10 on the substrate 5 (which may result in a strain S2 at least at a surface of the substrate 5 facing the first strained encapsulation layer 10), is reduced (or maybe even cancelled) because the further encapsulation layer 15 exerts a stress on the first encapsulation layer 10 which is opposite to the stress exerted by the first encapsulation layer 10 on the substrate 5 and the further encapsulation layer 15. Providing the further encapsulation layer 15 with an opposite stress even increases this effect as the stress exerted by the further encapsulation layer 15 to the first encapsulation layer is increased leaving less stress to be exerted to the substrate. The stress reduction in the substrate 5 results in a reduction of the substrate strain S2. Stress (and thus strain) is a critical factor in packaging. If the stress exceeds the mechanical strength of the films/substrate, the materials will have pinholes and cracks, which cause failure of the device. It is thus also a reliability issue to keep the stress on the substrate (and thus the strain) within acceptable levels. This is an advantage of the embodiment of FIG. 2.

The embodiment of FIG. 2(a) operates as follows. When the further encapsulation layer 15 is tampered, i.e. a hole is made in the layer 15, this will result in a releasing of the strain S1 of the first strained encapsulation layer 10. In case the first strained encapsulation layer 10 was compressively strained it will start to exert, locally, a tensile stress on the substrate 5 (or the tensile stress will at least become much larger locally). This stress, when large enough, will result in a strain S2 at least at a surface of the substrate 5 facing the first encapsulation layer 10. When this strain S2 (and thus the strain change) is large enough the internal stress in the substrate 5 will result in cracks and/or pinholes and eventually may break the substrate. Such mechanical disintegration may result in a disabling of the electronic circuit and thus ensure protection of any data therein against hackers.

The mechanical disintegration of the substrate 5 is enhanced when the strain in the first strained encapsulation layer 10 is a compressive strain. In that case a tensile strain is created at a surface of the substrate 5 facing the first strained encapsulation layer 10, which results in cracks and/or pinholes at a front-side of the IC, which is the same side as the side which is being tampered. This mechanism works satisfactory provided that the first strained encapsulation layer 10 and the substrate 5 are dimensioned properly. Here, proper dimensioning means, amongst other things, for example, choosing the right thicknesses for the first strained encapsulation layer 10 and the substrate 5 and choosing the right materials for the first strained encapsulation layer 10. More information on proper dimensioning will be given later in the description. It is believed that pre-conditioning of the substrate (in terms of material, defects, thickness, etc) is one of the more important factors.

In case the first strained encapsulation layer 10 has a tensile strain, a compressive strain is induced at a surface of the substrate 5 facing the first strained encapsulation layer 10. Consequently, the substrate may bend (again in case of proper dimension of the layers and the substrate) which results in a tensile strain on the other side of the substrate 5. When this strain is large enough, cracks and/or pinholes may be generated at the back-side and eventually the substrate may break. This mechanism is more difficult than the previously described one.

Another mechanical disintegration which may be targeted at in the invention is delamination of layers with poor adhesion. Such delamination may also efficiently disable the electronic circuit.

FIG. 2(b) shows a second variant of the integrated circuit. This embodiment will only be discussed in as far as it differs from the first variant of FIG. 2(a). The difference with the first variant is that, next to the (first) strained encapsulation layer 10 and the further (strained) encapsulation layer 15, a second strained encapsulation layer 11 is provided on the back-side of the substrate 5 which is also covered with a further strained encapsulation layer 16. In this example the second strained encapsulation layer 11 is provided with a same strain S4 as the strain S1 of the first encapsulation layer 10. A consequence of this feature is that the strains induced in the substrate 5 will be more uniform (a smaller strain gradient in the substrate 5). This is better for the reliability of the integrated circuit. Yet a more important advantage of this embodiment is that a double-sided tamper protection is achieved. It is not essential that the strain S4 in the second encapsulation layer 11 is the same as that of the first encapsulation layer 10 (in fact they even may be oppositely directed). However, for reliability it is better if they are the same or at least comparable such that the stress (and strain) in the substrate is more uniform. Also, in order to obtain a more uniform (but low) strain in the substrate 5 it is advisory to provide the further strained encapsulation layer 16 on the back-side of the substrate with the same strain as the further strained encapsulation layer 15 on the front-side in order to obtain the same strain masking effect on both the front-side and the back-side.

FIG. 2(c) shows a third variant of the integrated circuit. This embodiment will only be discussed in as far as it differs from the other variants. The difference with the second variant is that the (first) strained encapsulation layer 10 and the further strained encapsulation layer 15 are provided all around the substrate 5. Such a structure is manufactured more easily using the already mentioned techniques in the description of FIG. 1(c).

FIGS. 3(a) to 3(c) illustrate the tamper resistance mechanism of the embodiment of the integrated circuit as illustrated in FIG. 1(c). The functioning will be explained a bit more detailed than for the embodiment of FIG. 1(c). FIG. 3(a) illustrates the device of FIG. 1(c) with the only further specific detail that the electronic circuit 25 is illustrated in the figure. Furthermore some other details have been left out to facilitate reading of the drawing. Only one strain detector 20 has been illustrated in order to facilitate understanding of the invention. In a real design there may be any number of strain detectors 20 the number being equal to or larger than 1. The electronic circuit 25 is arranged for receiving a signal from the strain detector 20 which is indicative of a strain change. In FIG. 3(a) it may be observed that the induced strain at a surface at the front-side of the substrate 5 is substantially constant over the integrated circuit (at a surface of the substrate 5).

In FIG. 3(b) a tamper attempt TA is illustrated in which a hole is made in the first strained encapsulation layer 10. The local removal of the first strained encapsulation layer 10 during the tamper attempt TA immediately has an impact on the induced strain S2 in the substrate. The tensile strain S2 (induced by the compressive strain in the first encapsulation layer 10 in this particular example) immediately reduces. This may be accompanied by a small bending of the substrate 5 (here illustrated by the arrows on the edges of the substrate). The strain change is detected by the strain detector 20.

In FIG. 3(c) the strain detector gives a signal RS to the electronic for triggering a disabling of the electronic circuit 25.

Such disabling may be done in a large variety of ways. One way is to reset (illustrated by a dashed box around the electronic circuit 25) any possible memory elements (not shown) which may be present in the electronic circuit 25. For this purpose the electronic circuit 25 may further comprise a specialized disabling circuit (not shown). Alternatively, the disabling circuit may be provided as a module outside the electronic circuit 25. Another way to disable the electronic circuit is to blow up some resistive fuses. The person skilled in the art may easily come up with other ways of disabling the electronic circuit 25. Nevertheless, all these disabling techniques do not depart from the scope of the invention as defined in the claims. In case the memory elements in the electronic circuit are part of a non-volatile memory specialized power sources may be used to erase the memory. The use of power sources to erase such memory is well known, see for example U.S. Pat. No. 5,233,563 and US2006/0124046 A1. These two documents are hereby incorporated by reference in their entirety. This paragraph applies to all embodiments where a disabling mechanism is initiated by a signal from a detector.

Figure 4:
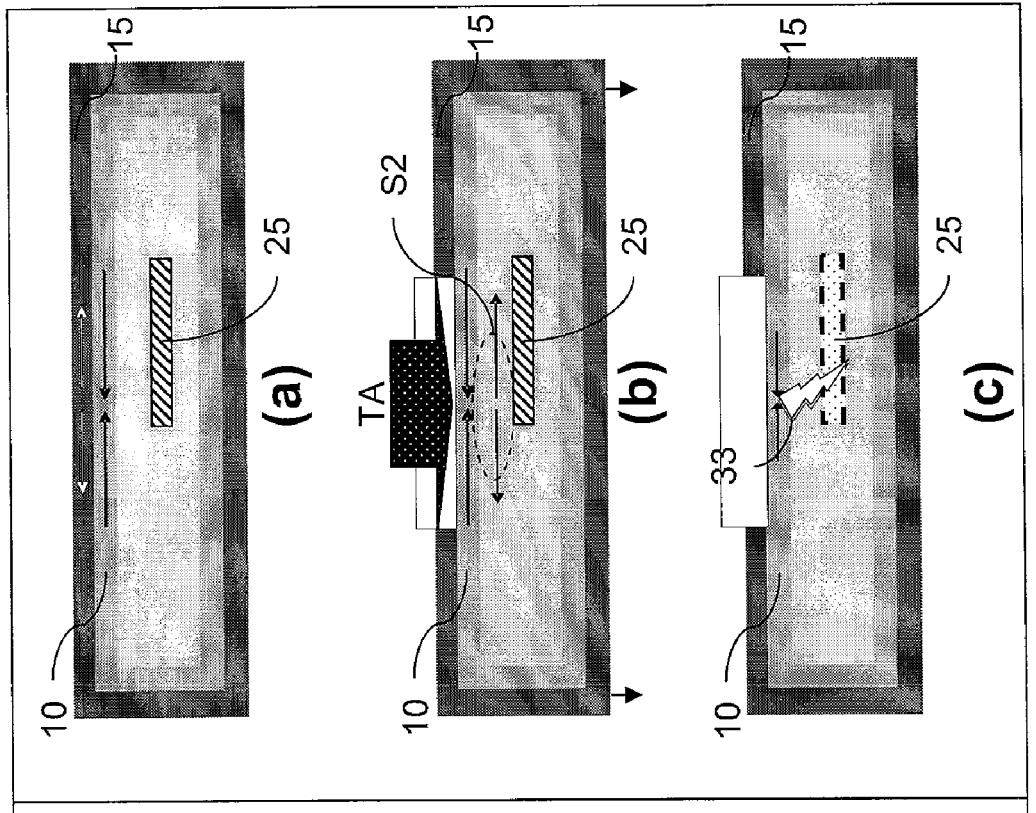
FIGS. 4(a) to 4(c) illustrate the tamper resistance mechanism of the embodiment of the integrated circuit as illustrated in FIG. 1(c)

FIGS. 4(*a*) to 4(*c*) illustrate the tamper resistance mechanism of the embodiment of the integrated circuit as illustrated in FIG. 2(*c*). The functioning will be explained a bit more detailed than for the embodiment of FIG. 2(*a*). FIG. 4(*a*) illustrates the device of FIG. 2(*c*) with the only further specific detail that the electronic circuit 25 is illustrated in the figure. Furthermore some other details have been left out to facilitate reading of the drawing.

In FIG. 4(*b*) a tamper attempt TA is illustrated in which a hole is made in the further strained encapsulation layer 15. The local removal of the further strained encapsulation layer 15 during the tamper attempt TA immediately has an impact on the induced strain S2 in the substrate, because, at least locally, the strain S1 of the first strained encapsulation layer 10 is "released". Consequently, a tensile strain S2 (induced by the compressive strain S1 in the first encapsulation layer 10 in this particular example) is created. This may be accompanied by a small bending of the substrate 5 (here illustrated by the arrows on the edges of the substrate 5).

In FIG. 4(*c*) it is illustrated what happens in case the substrate 5, the first encapsulation layer 10, and the further encapsulation layer 15 are properly designed in accordance with the invention. When the strain S2 in the substrate 5 induced by the first strained encapsulation layer is increased to a level that is high enough a crack and/or pinhole 33 may be formed at the front-side of the substrate 5 (because of the tensile strain S2 in that part of the substrate 5). The forming of a crack 33 at a location of the electronic circuit 25 is a way of disabling the electronic circuit.

It has been mentioned a multiple times in this description that for a proper operation of the embodiment of FIGS. 2 and 4, the integrated circuit must be properly designed in accordance with the invention. Throughout this description with these words it is meant that the parameters in the design space are chosen such that the desired effect, namely the mechanical disintegration of the substrate, is achieved. It must be mentioned that the design space is extremely multi-dimensional, i.e. has many design parameters. Nevertheless, the various design parameters mentioned above are also (heavily) dependent on each other.

The skilled person knows how to choose the parameters such that the desired effect is achieved. A few guidelines for the dimensioning and selection are here given. The most important parameters out of the total design space are:

- substrate area (the larger the area, the more easy to break the substrate);
- substrate thickness (the thinner the substrate, the more easy to break the substrate);
- substrate material and properties (material choice has a large influence on the mechanical properties such as the maximum allowable stress and strain limits, also including pre-existing and intentionally-made defects);
- first encapsulation layer thickness (the larger the thickness of the first encapsulation layer material, the larger the stress applied to the substrate);
- first encapsulation layer material and properties (material choice has a large influence on the mechanical properties such as the maximum allowable stress and strain limits);
- the strain in the first encapsulation layer (the larger the strain, the easier the substrate is disintegrated mechanically during a tamper attempt);
- further encapsulation layer thickness (the larger the thickness of the further encapsulation layer material, the larger the stress/strain compensation effect in the substrate);
- further encapsulation layer material and properties (material choice has a large influence on the mechanical properties such as the maximum allowable stress and strain limits), and
- the strain in the further encapsulation layer (the larger the strain, the better the strain compensation effect in the substrate). More information on strain can be found on the following web-sites:
  http://en.wikipedia.org/wiki/Fracture_toughness
  http://www.design.caltech.edu/Research/MEMS/silicon-prop.html.

It is relatively difficult to give a general value for the required strain, since this depends on many of the earlier mentioned parameters, and depends also strongly on the substrate and moreover even more on the amount of pre-existing defects in the substrate.

Figure 3:
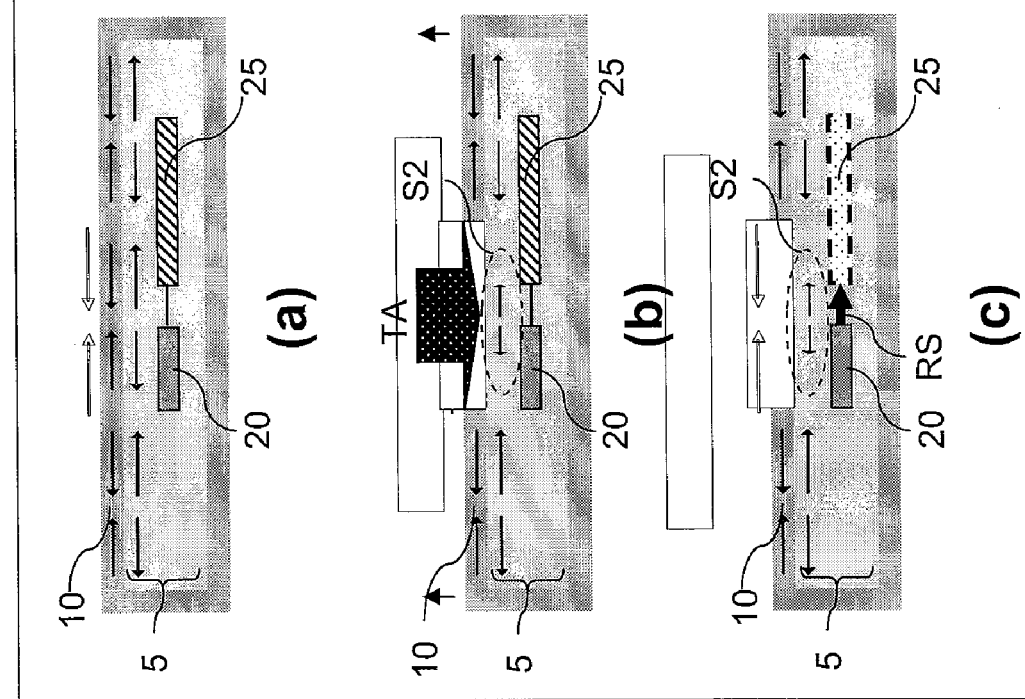
FIGS. 3(a) to 3(c) illustrate the tamper resistance mechanism of the embodiment of the integrated circuit as illustrated in FIG. 1(c)

The guidelines given above are also largely applicable to the design of the embodiment of FIGS. 1 and 3. However, in those embodiments the requirements are less stringent as there the only requirement is that the strain change in the substrate is detectable by the strain detector. Breaking a substrate may require stronger stresses and larger strains.

In a preferred embodiment of the integrated circuit of FIGS. 2 and 4, the substrate is thinned down from its backside (using well known techniques such as chemical-mechanical grinding or chemical etching for example) to a range between 20 µm and 100 µm.

Figure 5:
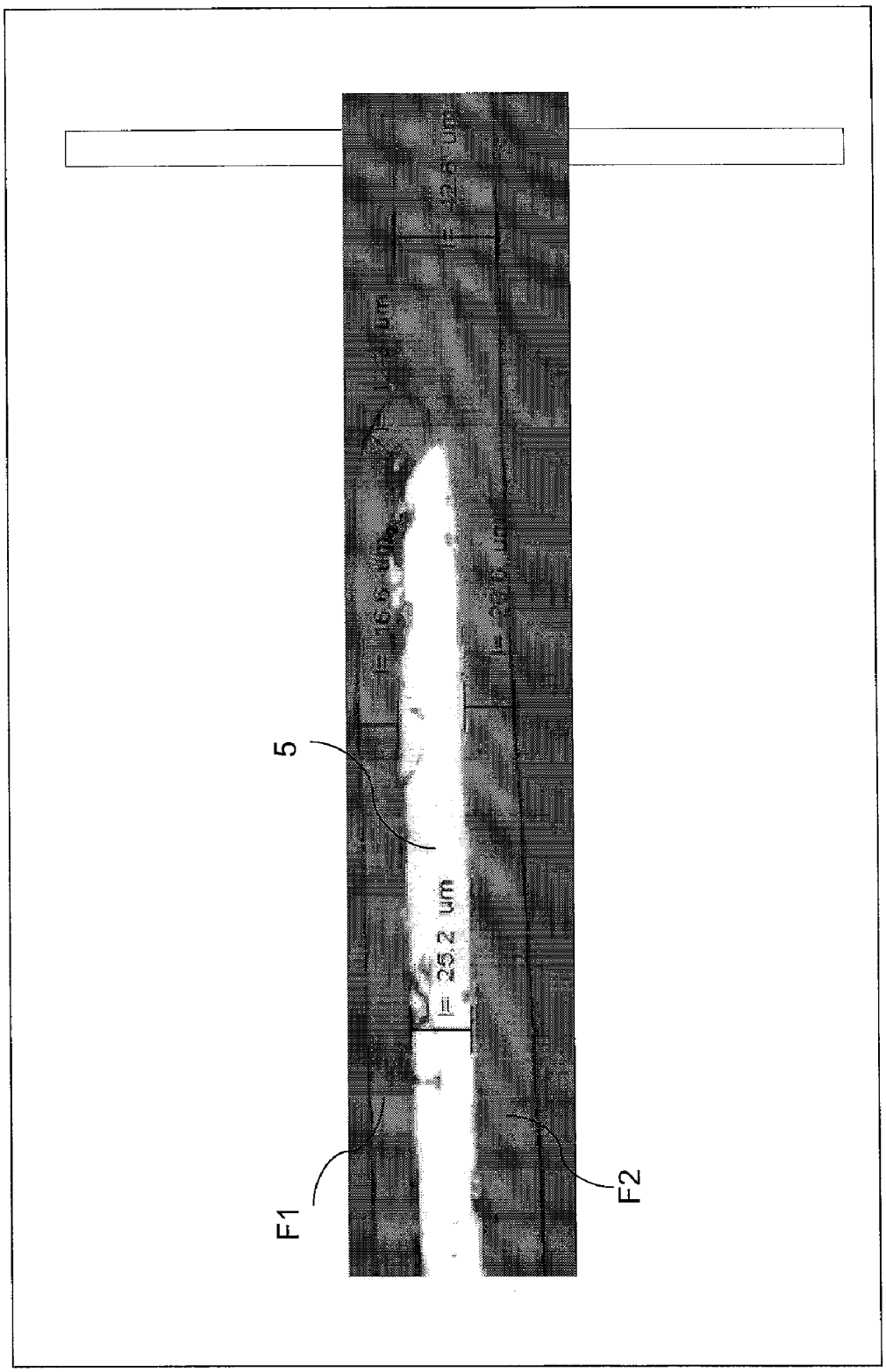
FIG. 5 illustrates an embedded 25 μm thick integrated circuit between 2 polyimide encapsulation layers, resulting in a 60 μm thick package.

FIG. 5 (source: Interuniversity MicroElectronics Centre (IMEC)) illustrates an embedded 25 µm thick integrated circuit between 2 polyimide encapsulation layers, resulting in a 60 µm thick package. A first polyamide encapsulation layer F1 is provided on a first side of the substrate 5, and a second polyamide encapsulation layer F2 is provided on a second, opposing, side of the substrate 5. The substrate 5 in this example about 25 µm thick and the polyamide encapsulation layers F1, F2 are each about 20 µm thick and result in a 60 µm thick package. The package integrated circuit of FIG. 5 may be manufactured by using a lamination process. Lamination is a technique which is known from the prior art. For instance, U.S. Pat. No. 6,823,919B2 gives a clear overview of a single sided lamination flow, whereas U.S. Pat. No. 6,893,521B2 gives a clear overview of a double-sided lamination flow. Both documents are hereby incorporated by reference in their entirety.

There are different ways of depositing a polymer film with a strain. Residual stress (and thus also strain) of a (polymer) film is generally generated due to a thermal expansion mismatch between the film and the substrate onto which it is deposited. One way to add stress in the package is to apply the encapsulation layer F1, F2 at elevated temperature. Afterwards, after cooling-down of the encapsulation layer F1, F2, the encapsulation layer will shrink (CTE>0) or expand (CTE<0) and strain is automatically present. Alternatively, in particular during a lamination process, the encapsulation layer (i.e. polymer film) may be stretched during lamination. This results in a tensilely strained encapsulation layer.

Typically, the integrated circuit inside a package should be connected to the exterior through bond-wires or bumps. This means that the bond wires are applied either before or after the addition of the strain in the package. In the first case, one could apply the bond wires (or bumps) on the bond pads and deposit the strained encapsulation layers (not possible in a lamination process). In order to do so, reflow should be applied. Reflow, also being referred to as "underfill", is a technique which is known from the prior art, for example from: U.S. Pat. No. 6,228,679. This document is hereby incorporated by reference in its entirety. In the second case, the coating of the strained encapsulation layers could be done already at wafer-level, afterwards the bond pads are opened again (using standard lithography and dry-etching). After sawing of the wafer, the bonding can be done.

Lamination processes are particularly attractive for ICs, which communicate with the exterior world by means of an antenna. No (contact) holes in the encapsulation layer are then required.

Figure 6:
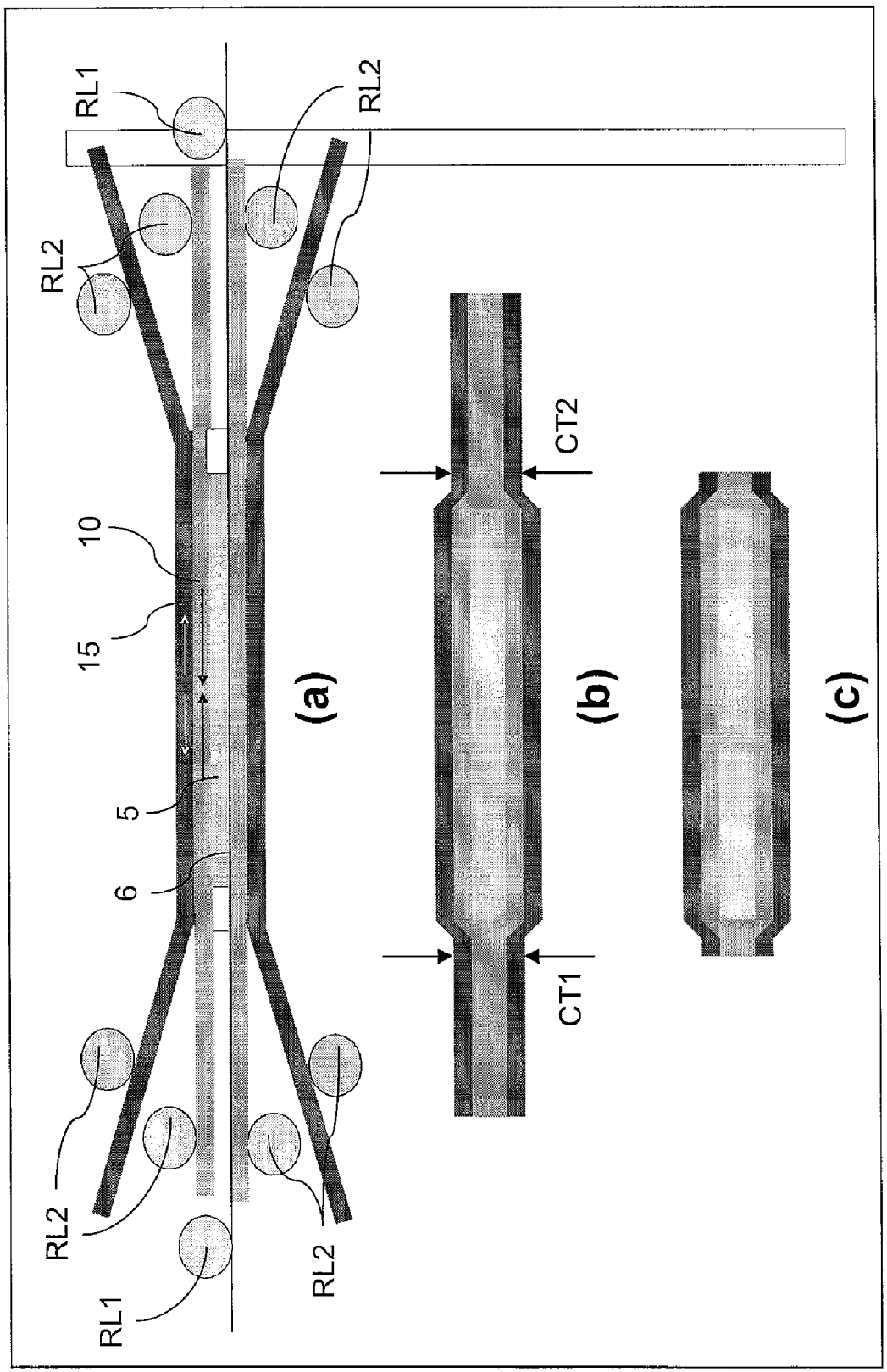
FIGS. 6(a) and 6(c) illustrate a double/sided lamination method of an integrated circuit using two polymer films on both sides of the substrate.

There are many different ways of depositing strained layers on a substrate. The person skilled in the art may easily come up with a lot of alternative steps and process flows. All such variations are considered as not departing from the scope of the invention as defined by the claims. Nevertheless, there are embodiments of the method of manufacturing the integrated circuit in accordance with invention which deserve special attention as they have a clear advantage over others. For example, FIGS. 6(a) and 6(c) illustrate a double-sided lamination method of an integrated circuit using two polymer films on both sides of the substrate. In FIG. 6(a) there is a schematic representation of an apparatus for carrying out a double-sided lamination. A substrate 5 is transported on a substrate carrier 6 between a first set of transport rolls RL1. Further transport rolls RL2 are provided for bringing the first encapsulation layer (film) 10 and the further encapsulation film 15 to the substrate substantially simultaneously. As already described earlier such lamination may be carried out at elevated temperature in order to create residual stress/strain at operation temperature. Also different materials may be chosen for the first encapsulation layer 10 and the further encapsulation layer 15 in order to obtain opposite residual stresses in the encapsulation layers 10, 15 (i.e. one material with positive CTE and one with negative CTE). The major advantage of this embodiment of the method of manufacturing of FIG. 6 is that the encapsulation layers 10, 15 are brought to the substrate 5 simultaneously such that any induced stress in the substrate is low right from the beginning of the manufacturing. This is better for the reliability of the integrated circuit. After that the substrate 5 and the encapsulation layers 10, 15 are brought together the stack may undergo a thermal compression step in order to establish a firm package. Such thermal compression step is advisory in all cases but especially in cases of a compressively strain encapsulation layer.

In the step of FIG. 6(b) the stack is cut at a first location CT1 and at a second location CT2, which result in the package as illustrated in FIG. 6(c). More information on the double-sided lamination flow can be found in U.S. Pat. No. 6,893,521B2.

Figure 7:
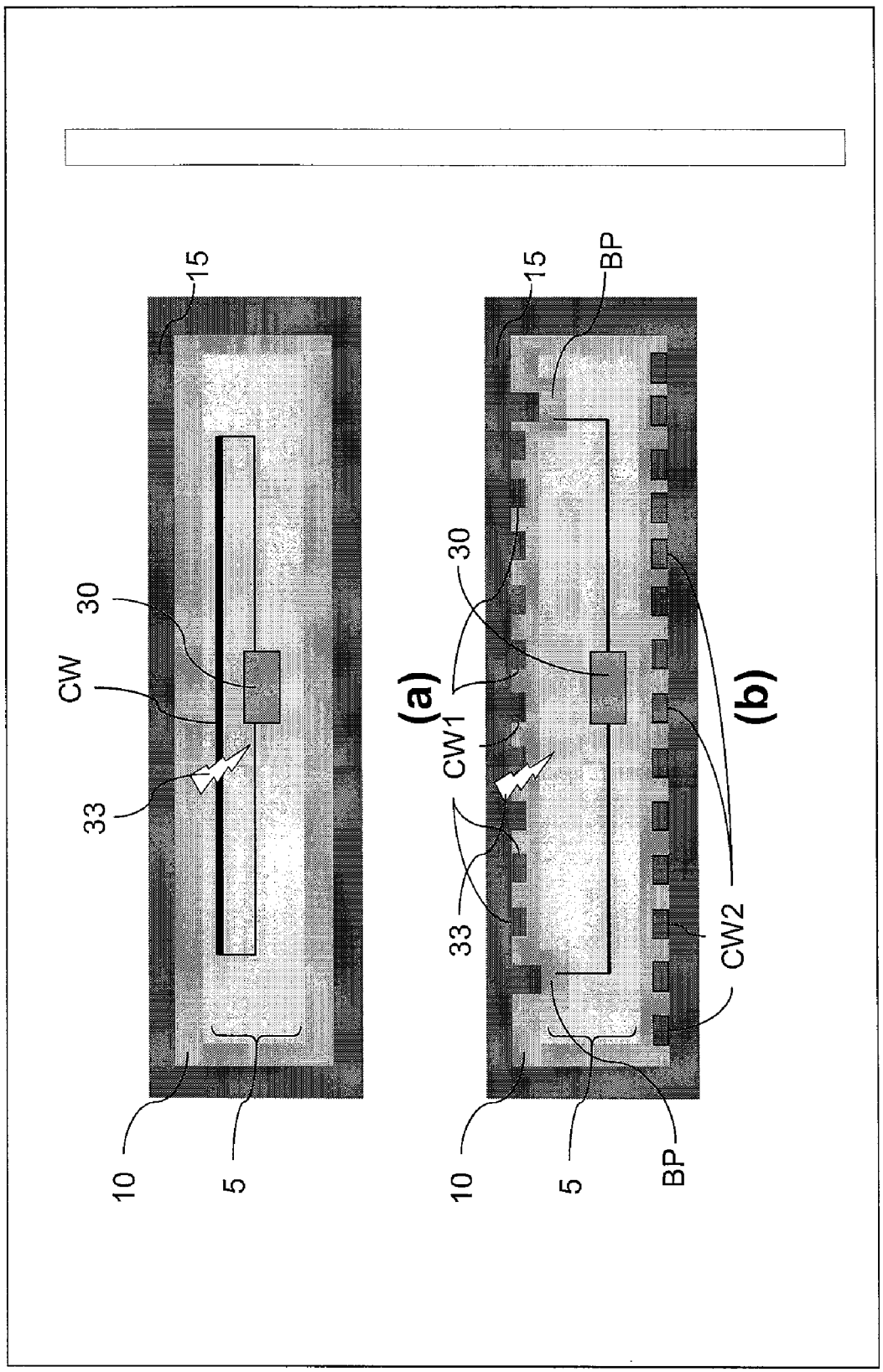
FIGS. 7(a) and 7(b) illustrate two variants of an integrated circuit in accordance with further embodiments of the invention.

FIGS. 7(a) and 7(b) illustrate two variants of an integrated circuit in accordance with further embodiments of the invention. The protection technique here described is particularly suitable for combination with the embodiments of FIGS. 2 and 4. In those earlier embodiments it might happen that the mechanical disintegration of the substrate 5 is not large enough to prevent access to data in the electronic circuit. It is an object of the embodiments of FIGS. 7(a) and 7(b) to prevent data access even though the substrate is still substantially in tact after a tamper attempt. The variant of FIG. 7(a) comprises a substrate 5 having encapsulation layers 10, 15 just like FIG. 2(c). The difference with FIG. 2(c) is that the substrate now further comprises a conductive wire CW which is sensed by an integrity sensor 30. The integrity sensor 30 is arranged for sensing any interruption in the conductive wire CW. When the conductive wire CW is placed in the interconnect stack of the integrated circuit and covers a specific area of the substrate, a crack or pinhole 33 caused by the tamper attempt may be detected as such crack or pinhole will at least result in a change of the resistance of the conductive wire CW and at best an interruption of the conductive wire CW. Similar to the embodiment described in FIGS. 1 and 3 such change may be used as a trigger for disabling the electronic circuit (not shown). In that respect the embodiments of FIGS. 7(a) and 7(b) have some similarity with the embodiments of FIGS. 1 and 3. The conductive wire CW may be provided as a meander structure for obtaining a larger protected area.

The variant of FIG. 7(b) differs from the variant of FIG. 7(a) in that a conductive wire CW1 is here provided in the first encapsulation layer 10. Such a conductive wire could be applied in the first encapsulation layer 10, for example, by using screen-printing technology which well known to the person skilled in the art. The material used for screen printing is typically silver, gold, tin, aluminum, and many other conductive materials. Alternatively, ink-jet printing, e-beam writing, or standard lithography may be used to provide the wire in the first encapsulation layer using the same materials. The conductive wire CW1 is electrically connected to the integrity sensor 30 through (at least two) bondpads BP. The connection to the bondpads underneath can be obtained by etching a hole through the first encapsulation layer 10 before screen-printing. A further conductive wire CW2 may be applied in the same way on the back-side of the substrate 5. Such a conductive wire CW2 can be contacted through a bond-wire or even through a through-substrate via.

The operation of the embodiments in FIGS. 7(a) and 7(b) are similar. Any crack, or pinhole caused by a tamper attempt of the further encapsulation layer 15 may result in a resistance change or even an interruption of the conductive wire CW, CW1, CW2. This interruption or resistance change is subsequently detected by the integrity sensor 30 (which may be a simple resistance measurement circuit) and this is used as a trigger for disabling the electronic circuit (not shown) in ways already discussed earlier in this description.

All embodiments of the integrated circuit in accordance with the invention provide essentially an alternative tamper protection to the data stored or present in the electronic circuit therein. A first main group of embodiments concerns an integrated circuit wherein tamper protection is obtained by detecting a change in an induced strain in the substrate caused by tampering with an intentionally strained encapsulation layer and subsequently disabling the electronic circuit. A second main group of embodiments concerns an integrated circuit wherein tamper protection is obtained by designing a stack of strained encapsulation layers, such that, in an untampered state the strains in the encapsulation layers tend to compensate each other, and, such that, during tampering with the integrated circuit a strain of the lower encapsulation layer is released, causing the integrated circuit to mechanically disintegrate and thus disabling the electronic circuit.

The invention may be applied in a wide variety of application areas, for example in smart cards, bank-cards, contactless cards, and RFID's. However, there are many more application areas where the invention may be used. Basically, any application where data in an integrated circuit needs to be protected against tampering, for example by hackers.

Various variations of the integrated circuit and system in accordance with the invention are possible and do not depart from the scope of the invention as claimed. These variations for example relate to material choice, layer thickness, spatial arrangement of the elements, etc. Also, in the method of manufacturing an integrated circuit in accordance with an embodiment of the method of the invention, many alterations are possible. Such alterations fall within the normal routine of the person skilled in the art and do not deviate from the inventive concept here disclosed. Especially in the manner of providing the encapsulation layers many variations are possible or may even become possible in near future.

Another variation concerns the provision of the encapsulation layers. Throughout the description these layers have been drawn such that they cover the full integrated circuit. This is not always needed. So, in a variation on the illustrated embodiments the encapsulation layers are only provided on part of the integrated circuit. Protection of data in the electronic circuit is achieved as long as the encapsulation layers are provided on the vital parts of the electronic circuit which comprise the data.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. An integrated circuit comprising an electronic circuit integrated on a substrate, and further comprising protections means for protection of the electronic circuit, the protection means comprising: a first strained encapsulation layer being provided on a first side of the substrate, wherein the first strained encapsulation layer has a strain in a direction parallel to the substrate, and disabling means arranged for at least partially disabling the electronic circuit under control of a strain change in the substrate.

2. The integrated circuit as claimed in claim 1, wherein the disabling means comprises: at least one strain detector for detecting the strain change in the substrate, and a disabling circuit being arranged for receiving a signal indicative of the strain change from the strain detector, the disabling circuit being coupled to the electronic circuit for disabling the electronic circuit upon detection of the strain change in the substrate.

3. The integrated circuit as claimed in claim 1, wherein the protection means further comprises a second strained encapsulation layer being provided on a second side, opposite to the first side, of the substrate, wherein the second strained encapsulation layer has a strain in a substantially same direction as a strain in the first strained encapsulation layer.

4. The integrated circuit as claimed in claim 1, wherein the first strained encapsulation layer and/or the second strained encapsulation layer comprises polymer or ceramic material.

5. The integrated circuit as claimed in claim 1, wherein the disabling means further comprises a further encapsulation layer being provided on the first strained encapsulation layer and being arranged for reducing strain in the substrate caused by the first strained encapsulation layer, wherein the substrate and the first and further encapsulation layers are configured for mechanical disintegration, for example breaking or delaminating, of the integrated circuit under a strain change in the substrate, wherein the train change is caused by tampering with the further encapsulation layer which releases the strain in the first strained encapsulation layer and thereby increases the strain in the substrate.

6. The integrated circuit as claimed in claim 5, wherein the further encapsulation layer has a strain in a direction substantially opposite to a strain in the first strained encapsulation layer.

7. The integrated circuit as claimed in claim 5, wherein the substrate has a spatially varying thickness for facilitating controllably breaking of the substrate.

8. The integrated circuit as claimed in claim 7, wherein the substrate is provided with at least one indentation or trench at least at one side for facilitating the breaking of the substrate, wherein a location of the indentation is chosen to correspond with a location of the electronic circuit.

9. The integrated circuit as claimed in claim 5, wherein the disabling means further comprise: a conductor, an integrity sensor coupled to the conductor for sensing a change in integrity of the conductor, wherein the mechanical disintegration causes damage to the conductor, and a further disabling circuit being arranged for receiving a signal indicative of the integrity of the conductor, the further disabling circuit being coupled to the electronic circuit for disabling the electronic circuit upon sensing of a change in the integrity of the conductor.

10. A method of manufacturing the integrated circuit as claimed in claim 1, the method comprising:
   providing the electronic circuit integrated on the substrate, and
   providing the protection means, wherein this step comprises sub-steps of:
      providing the first strained encapsulation layer on a first side of the substrate, and
      providing the disabling means.

11. The method as claimed in claim 10 for the manufacture of the integrated circuit of claim 8, wherein providing the disabling means comprises the provision of the further encapsulation layer on the first strained encapsulation layer.

12. The method as claimed in claim 11, wherein the first strained encapsulation layer and the further encapsulation layer are provided using a lamination flow.

13. A system comprising the integrated circuit as claimed in claim 1.

14. The system as claimed in claim 13, wherein the system is selected from a group consisting of: a bank-card, a smart-card, a contact-less card and an RFID.

* * * * *